Oct. 18, 1949.  W. W. PAGET  2,484,846
PRESSURE CONTROL DEVICE
Filed May 18, 1942  2 Sheets-Sheet 1

Inventor:
Wm. W. Paget.
by
Attorney

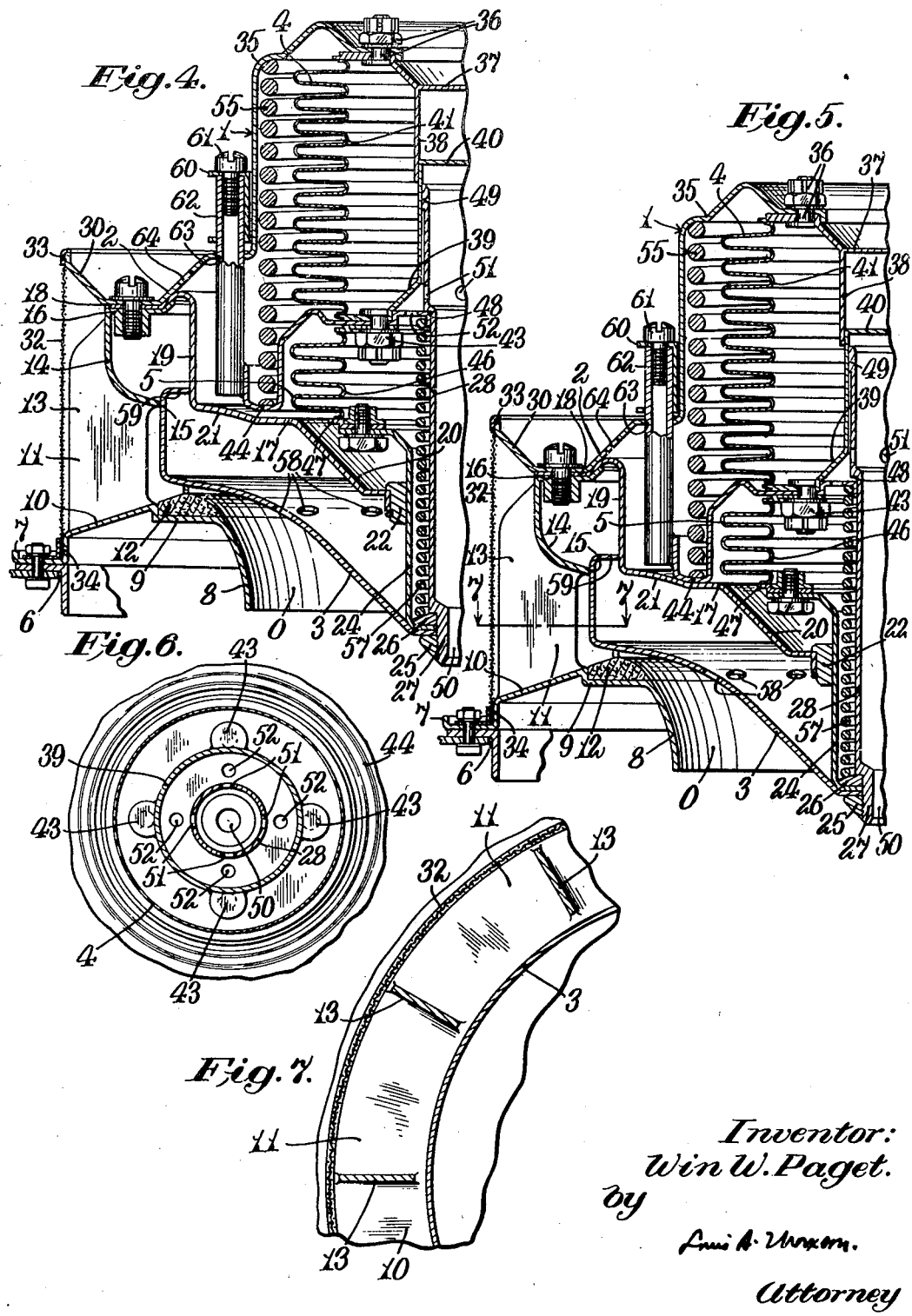

Patented Oct. 18, 1949

2,484,846

UNITED STATES PATENT OFFICE 2,484,846

PRESSURE CONTROL DEVICE

Win W. Paget, Michigan City, Ind., assignor to Joy Manufacturing Company, a corporation of Pennsylvania Application May 18, 1942, Serial No. 443,413

26 Claims. (Cl. 98—1.5)

My invention relates to pressure control devices, and more particularly to automatic pressure control devices especially adapted to the regulation of pressure conditions in pressurized cabins for aircraft.

It is imperative for high altitude flight that the cabins of planes be pressureized. It is permissible that pressure in the cabin be allowed to follow freely the variations in external pressure until the plane reaches a predetermined height, for example 8,000 feet. Thereafter, it is preferable that until a considerably greater height is reached, say 35,000 feet, the pressure in the cabin be maintained relatively constant at approximately the pressure which corresponds to 8,000 feet. It is further desirable that if the plane have occasion to go above the upper limit mentioned, there shall be a variation in the cabin pressure with the changes in altitude so that the cabin pressure may again be reduced as the external pressure becomes lower whereby when the plane is above, say, 35,000 feet the cabin pressure will be progressively reduced with higher elevations, and, for example, the same difference between cabin and external pressure which prevailed at 35,000 feet will be maintained through lowering of the cabin pressure. This capacity is very important both because it reduces the danger of damage to the cabin through excessive pressure differential between the inside and the outside thereof, and it also relieves the load on the pressurizing device which has to raise the pressure of the very rarefied atmosphere to cabin pressure and which must work very hard at such extreme heights unless the cabin pressure can be further reduced. It is furthermore important that devices of the present character be very simple in construction and that they have provision for the freeing of their parts from ice which may form upon them in use.

An object of the present invention is to provide an improved automatic pressure control device. It is another object of my invention to provide an improved automatic pressure control device having improved means for rendering it subject successively to different controls. A further object of the invention is to provide an improved automatic pressure control device having an improved arrangement of pressure responsive elements. It is still another object to provide an improved automatic pressure control device especially adapted for the control of cabin pressures in airplanes. Still a further object of the invention is to provide an improved automatic pressure control device automatically operative to maintain uniformity of pressure conditions under certain external pressures and a changing set of pressure conditions under other external pressures. Yet another object of the invention is to provide an improved automatic pressure control device automatically operative to maintain substantial uniformity of cabin pressure conditions during flight at certain altitudes and cabin pressure conditions varying as altitude varies above a predetermined higher altitude. Another object is to provide an improved automatic pressure control device operative to permit cabin pressure to vary substantially directly with external pressures up to a predetermined altitude and then during certain further increases in altitude to maintain cabin pressure substantially constant, and, when a still higher altitude is reached, to provide for the maintenance of a cabin pressure which shall bear a relatively constant relation to the external pressure. Still another object is to provide an improved pressure responsive valve mechanism for controlling communication between the interior of a cabin and the amosphere, said valve mechanism operating automatically to vary the communication so that cabin pressures are maintained substantially constant during flight at certain altitudes, and so that cabin pressures vary directly with external pressures during flight at higher altitudes. Yet another object is to provide an improved valve mechanism operating automatically in accordance with pressure conditions surrounding a cabin for controlling communication between the interior of the cabin and atmosphere.

Other objects and advantages of the invention will appear from the following description and from the appended claims.

The invention will be readily understood when it is borne in mind that the cabin of the plane with which it is described in use in the following description is having air constantly pumped into it during flight and that the rate of escape of the air will determine the cabin pressure. Of course the volume of air introduced in unit time will vary at different altitudes, but the control of air escape will still be decisive in the maintenance of cabin pressure.

In the accompanying drawings, in which I have shown for purposes of illustration one embodiment which my invention may assume in practice, Fig. 1 is a side elevational view of the pressure control device, shown detached from its support.

Fig. 4 is a fragmentary, sectional view similar to Fig. 3 showing the vent valve in nearly closed position, with the control still essentially by the primary control bellows.

Fig. 5 is a sectional view similar to Fig. 4 showing the vent valve also in nearly closed position but with the control thereof taken over by the secondary control bellows.

Fig. 6 is a detail horizontal sectional view on planes corresponding to the line 6—6 of Fig. 3.

Fig. 7 is a fragmentary horizontal sectional view on the plane of the line 7—7 of Fig. 5, showing features of the valve casing construction.

Figure 1:
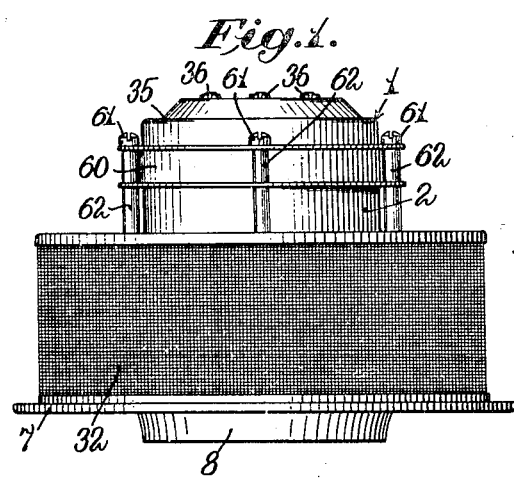
Figure 2:
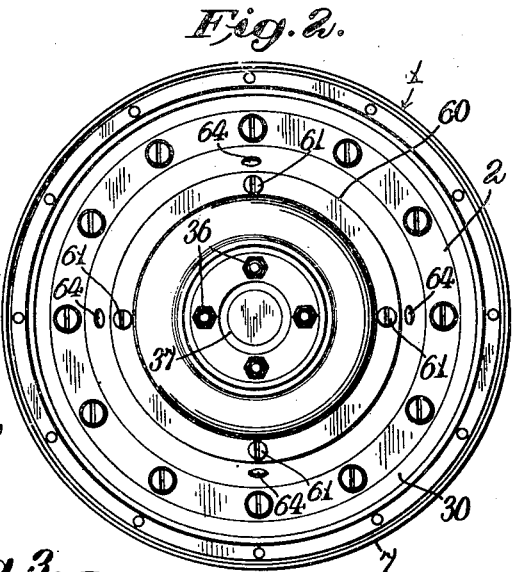
Fig. 2 is a plan view of the device shown in Fig. 1.

Referring to the drawings, it will be observed that the valve device as a whole is designated 1, and it comprises a stationary casing 2, a balanced vent valve 3, a primary control bellows 4, and a secondary control bellows 5.

The stationary casing 2 is mounted over an opening 6 in a wall of the cabin, the pressure within which is to be controlled. It includes a lower annular portion 7, which is made up of a tapering-discharge-orifice providing portion 8 which projects within the opening 6 and through which the discharge orifice O opens. The portion 8 is surrounded by an annular valve seat supporting portion 9, and an outer frusto-conical wall portion 10 which forms the lower boundary for a generally annular passage 11 communicating with the interior of the cabin. A suitable valve seat element 12, of fibre or similar material, is mounted on the seat support 9. Supported by suitable webs 13 on the portion 10 is an upper annular wall 14 surrounding at its lower end a circular opening 15 and at its own upper end providing an annular seating surface 16. Supported on the seating surface 16 is a casing member 17 comprising a flange 18 resting on the surface 16, a cylindrical wall 19 coaxial with the discharge orifice O, and finally, a tapering downwardly projecting wall portion 20 providing a stop at 21 for the vent valve 3 when the latter is in full open position, and also supporting at its lower end a guide bushing 22 for a valve stem 24. The valve stem 24 is clamped, with the vent valve 3, between a nut 25 and a stop collar 26 which engages a shoulder surrounding a reduced, threaded hollow portion 27 on the lower end of an elongated tubular member 28.

Also supported by the seating surface 16 but resting on the flange 18 is a top casing member 30 which has an outwardly flaring portion 31, which coacts with the wall portion 10 to bound the annular opening through which fluid enters the valve casing. A suitable screen 32 engages cylindrical flange portions 33 and 34 on the walls 30 and 10 to prevent the access of material that might damage the valve mechanism, to its interior. The top casing member also includes a top, turretlike, supporting and bearing section 35.

Secured, as by screw and nut devices 36, to the inner side of the upper end of the turret portion 35 is the sealed collapsible and expansible primary bellows or diaphragm device 4 which comprises an upper plate 37 providing a cylindrical downwardly projecting guide portion 38, a lower plate 39 having an upwardly projecting guide portion slidably fitting within the guide portion 38 and closed at its top, as at 40, and a bellows portion 41 in sealed connection with the outer edges of the plates 37 and 39. The air is very largely removed from the interior of the bellows device 4 for reasons that will later be explained. Clamped by holding devices 43 to the lower plate or frame 39 is a spring abutment plate 44 and a top plate 45 forming the upper end of the secondary control bellows 5. This bellows device comprises also a bellows portion 46 and a lower end plate 47, and to the latter there is clamped the flanged upper end of the valve stem 24. The spring abutment plate 44 has an inward flanged portion which slidably engages the elongated tubular member 28. This tubular member at its upper portion has a shoulder 48 engageable with the upper side of the spring abutment plate 44. Above the shoulder the member 28 is of increased diameter, but still not so large as the bore within the portion 39 of the lower end member of the primary bellows device, and at its extreme top has a collar portion 49 which fits in and has guided coaction with the bore in the guide portion on the plate 39. The member 28 has its interior in communication with the space surrounding the cabin through a passage 50 in the portion 27. It further has communication with the wall 40 which is movable with the lower end of the primary bellows device 4; and it finally has communication through radial openings 51 in its wall and openings 52 in the inner portion of the spring abutment plate 44 with the interior of the bellows device 5. A relatively long spring 55 extends between the spring abutment plate 44 and a surface 56 within the turret 35. Another relatively long spring 57 extends between the washer 26 and the inner portion of the spring abutment plate 44. These springs are made long so that small changes in their length, as expansion or compression takes place, will involve but small changes in the pressures exerted.

The valve 3, which is generally of an inverted cone type, is traversed by openings 58 and has a peripheral cylindrical portion which is adapted to be guided by the wall surrounding the opening 15 and which has an inwardly directed top flange 59 which is adapted to cooperate in guided relation with the cylindrical wall 19. This valve is a nearly perfectly balanced valve, so that it has a negligible effect on its own movements.

A collar 60, U-shaped in cross-section, slidably surrounds the turret portion 35. It is clamped by screws 61 to the tops of tubular elements 62 which are welded at their lower ends to the outer edge of the spring abutment plate 44. The elements 62 pass freely through openings 63 in the wall of the top plate 30 of the valve casing, which is traversed by additional openings 64 in order that cabin pressure may have free access to the chamber within the valve housing above the plate 17.

Now, as a preliminary to the description of the operation of this device, the following items should be noted. The primary bellows device 4 is internally evacuated so that it is collapsed to the degree shown in Fig. 3 whenever it is subjected externally to atmospheric pressure. The degree of collapse is limited by the engagement of the portion 40 of the lower end of the bellows device with the plate 37 at the top end of the bellows device. The strength of the spring 55 and its proportions and the proportions of the relatively completely evacuated bellows are so determined that the vent valve 3 will remain at least substantially against the surface 21 until cabin pressure falls to the value which corresponds to the predetermined lower elevation (say 8,000 feet) selected. Here let it be noted that the cabin pressure follows very closely the external pressure, notwithstanding the continuous supply of air into the cabin and the continuous outflow through the opening O, when the valve 3 is full open. It will be observed that until cabin pressure is reduced to the value which corresponds to an elevation of 8,000 feet (approximately 10.9 pounds absolute) the position of the plate 44 will not change and that the spring 57 cannot, because of the engagement of shoulder 48 with the plate 44, cause the valve 3 to move downward while the plate 44 is stationary. And it may be noted at this point that the spring 57 is made of such strength that only when the pressure within the bellows 5 reaches a value corresponding to a 35,000 foot elevation will the cabin pressure acting on the exterior of the secondary bellows 5 be able to cause the tube 28 to move upwardly relative to the plate 44.

Figure 3:
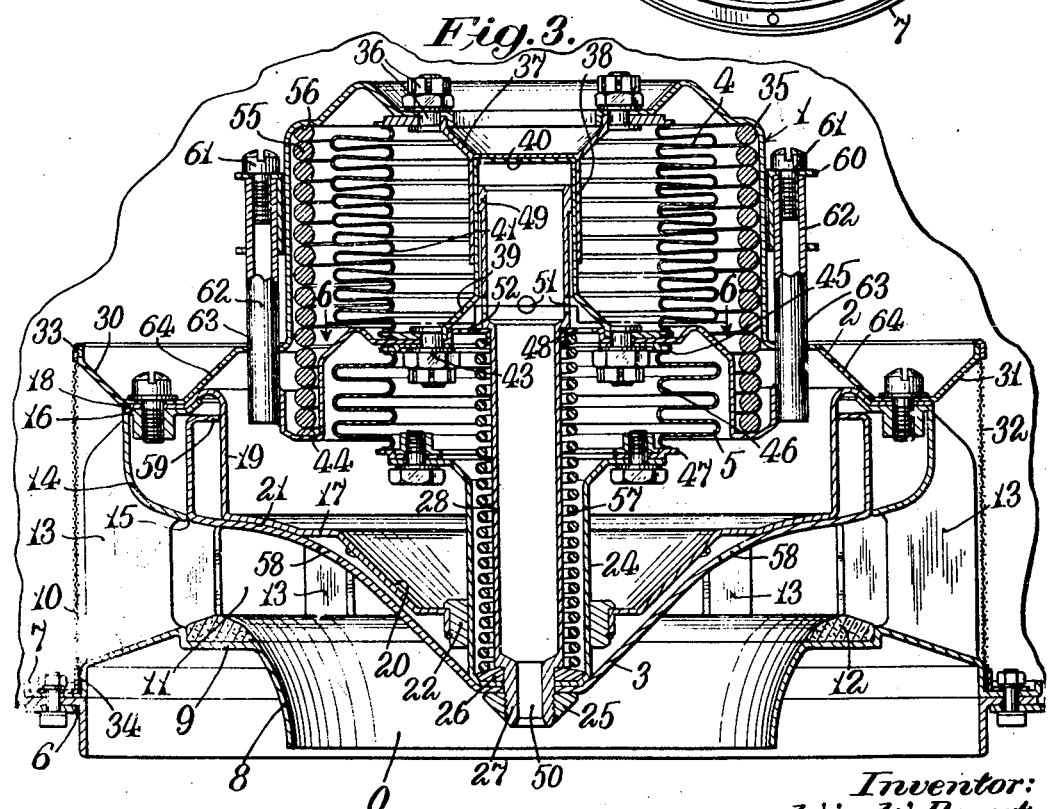
Fig. 3 is an enlarged central vertical sectional view through the device of Figs. 1 and 2, showing the same attached to its support and the vent valve which forms a part thereof in full open position.

Now the mode of operation of the mechanism which has been described can be readily understood. It will be appreciated that with the plane just taking off, the position of the parts will be as shown in Fig. 3. The valve 3 will then be wide open, the primary bellows device 4 being maintained in the relatively collapsed position shown by atmospheric pressure (approximately 14.7 pounds absolute) acting on an area equal to the area of the bore of the bushing 22, plus cabin pressure (possibly a trifle above atmospheric pressure) acting on the remaining effective area of the primary bellows device 4, and the position of the valve relative to the plate 44 being fixed by abutment with the latter of the shoulder 48. Of course, as previously explained, a suitable pump or compressor is continuously delivering air into the cabin as the plane is in operation.

As the plane rises, the pressure on the circular area mentioned reduces relatively proportionally with the increase in elevation and the device for delivering air to the cabin will continue to deliver air, but at a diminishing rate as the surrounding pressure diminishes. At approximately the predetermined height for functioning of the primary bellows device 4, the escape of air through the wide open opening O will reduce the pressure in the space above the wall 17 (which is cabin pressure) sufficiently, with the reduction in pressure on the area equal to the circle surrounded by the bushing 22, so that the spring 55 will be able to move the plate 44 downwardly, and the valve 3 will assume progressively lower positions, further throttling air escape from the cabin, as the plane continues to move higher. The spring 55 exerts a diminishing force as it expands, but there will be some compensation by reason of the fact that the pressure on the area equal to the bore of the bushing 22 will continue to diminish, and the valve's position will in general vary with the altitude, until at the second predetermined height (say 35,000 feet) the valve 3 will be nearly closed.

When the latter height is exceeded the internal pressure within the lower bellows device 5 will become so low that cabin pressure acting on the effective portion of the bellows will overcome the pressure of the spring 57 and cause the valve 3 to move upwardly relative to the plate 44, and thereafter the control will be by the differential between the cabin pressure and the external pressure until the plane again moves below the upper preselected level. There may be maintained, desirably, for example, a difference of approximately 7.5 pounds per square inch between the cabin pressure and external pressure, for the purposes previously explained.

The collar 60 and associated parts provide means which may be grasped by an operator and actuated so that the valve 3 may be moved briskly up and down relative to its seat to free it of ice. As soon as the manual movements of the sleeve are interrupted, there will be an automatic return of the parts to their position determined by the altitude and pressures. It may be noted that should there be an inadvertent holding down of the sleeve for any time, damage to the cabin will be prevented by the automatic opening of the valve 3 due to the automatic coming into operation of the secondary bellows 5 as soon as a sufficient differential between cabin and external pressure is developed.

It will be appreciated from what has been said above that I have provided as it were two bellows in series: bellows 4 and 5, the first acting through the second, when it expands, to effect closure of valve 3, and the second, when it is collapsed utilizing the first as an abutment, as it were, by means of which the valve opening force may be exerted.

As a result of this invention there is provided an improved pressure responsive device for controlling the pressures within the cabin of an airplane. It will be noted that the device operates automatically in accordance with the pressure conditions surrounding the cabin for varying the communication between the interior of the cabin and the atmosphere. By reason of the communication between the interior of the cabin and the atmosphere, there is obtained through the cabin a circulation of air that provides for the needs and comfort of the occupants. As the escape of air supplied to the interior of the cabin is varied in accordance with the pressure conditions surrounding the plane, the pressures within the cabin are maintained at values desired for different elevations of flight. The provision of manual means for operating the pressure responsive device assures against the locking of the device in any of its adjusted positions, and also makes possible the regulation of pressures within the cabin to values other than those obtained by the normal operation of the device. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A pressure control device comprising, in combination, a port, a valve seat surrounding said port, a valve member movable relative to said port and engageable with said valve seat, an evacuated bellows held at one end stationary relative to said valve seat and connected at its other end to a movable plate, a second bellows connected at one end to said movable plate and connected at its other end to said valve member, means operatively connecting said valve member to said plate for controlling relative movement therebetween, means for subjecting the exterior of both of said bellows to the pressures at one side of said valve seat, and means for subjecting the interior of said second bellows to the pressures at the opposite side of said valve seat.

2. A pressure control device comprising, in combination, a port, a valve seat surrounding said port, a valve member movable relative to said port and engageable with said valve seat, an evacuated bellows held at one end stationary relative to said valve seat and connected at its other end to a movable plate, a second bellows connected at one end to said movable plate and connected at its other end to said valve member, means including a member fixed to said valve member and operatively connected to said plate for limiting relative movement between said valve member and said plate, means for subjecting the exterior of both of said bellows to the pressures at one side of said valve seat, and means for subjecting the interior of said second bellows to the pressures at the opposite side of said valve seat.

3. A pressure control device comprising, in combination, a port, a valve seat surrounding said port, a valve member movable relative to said port and engageable with said valve seat, an evacuated bellows arranged coaxially with said port and held at its end remote from said valve stationary relative to said valve seat, and connected at its end nearer said valve member to a movable frame, a second bellows arranged coaxially with said port and connected at one end to said movable frame and connected at its other end to said valve member, means fixed to said valve member and operatively engaging said frame for limiting the expansion of said second bellows, means for subjecting the exterior of both of said bellows to the pressures at one side of said valve seat, and means for subjecting the interior of said second bellows to the pressures at the opposite side of said valve seat.

4. A pressure control device comprising, in combination, a port, a valve seat surrounding said port, a valve member cooperating with said valve seat for controlling the flow of fluid through said port, an evacuated bellows arranged coaxially with said port and held at its end remote from said valve stationary relative to said valve seat, and connected at its end nearer said valve member to a movable frame, a second bellows arranged coaxially with said port and connected at one end to said movable frame and connected at its other end to said valve member, means fixed to said valve member and operatively engaging said frame for limiting the expansion of said second bellows, stationary abutments for limiting expansion and contraction of said evacuated bellows, means for subjecting the exterior of both of said bellows to the pressures at one side of said valve seat, and means for subjecting the interior of said second bellows to the pressures at the opposite side of said valve seat.

5. A pressure control device comprising, in combination, a port, a valve seat surrounding said port, a valve member movable relative to said port and engageable with said valve seat, an evacuated bellows held at one end stationary relative to said valve seat and connected at its other end to a movable frame, a second bellows connected at one end to said movable frame and connected at its other end to said valve member, means for limiting the expansion of both and the contraction of one of said bellows, means for subjecting the exterior of both of said bellows to the pressures at one side of said valve seat, means for subjecting the interior of said second bellows to the pressures at the opposite side of said valve seat, means operating to expand said evacuated bellows when the pressure at its outer surface drops a predetermined amount, and means resisting contraction of said second bellows until the pressure differential between its inner and outer surfaces reaches a predetermined amount.

6. A pressure control device comprising, in combination, a port, a valve seat surrounding said port, a valve member cooperating with said valve seat for controlling the flow of fluid through said port, an evacuated bellows held at one end stationary relative to said valve seat and connected at its other end to a movable frame, a second bellows connected at one end to said movable frame and connected at its other end to said valve member, means operatively connecting said valve member to said frame for controlling relative movement therebetween, stationary abutment providing means engageable by said frame for limiting expansion of said evacuated bellows, means for subjecting the exterior of both of said bellows to the pressures at one side of said valve seat, means for subjecting the interior of said second bellows to the pressures at the opposite side of said valve seat, means operating to expand said evacuated bellows when the pressure at its outer surface drops a predetermined amount, and means resisting contraction of said second bellows until the pressure at its outer surface exceeds the pressure at its inner surface by a predetermined amount.

7. A pressure control device comprising, in combination, a port, a valve seat surrounding said port, a valve member engageable with said valve seat, an evacuated bellows held at one end stationary relative to said valve seat and connected at its other end to a movable frame, a second bellows connected at one end to said movable frame and connected at its other end to said valve member, an elongated member fixed to said valve member and engageable with said frame for limiting expansion of said second bellows, means for subjecting the exterior of both of said bellows to the pressures at one side of said valve seat, and means including passage means extending through said valve member and said elongated member for subjecting the interior of said second bellows to the pressures at the other side of said valve seat.

8. A pressure control device comprising, in combination, a port, a valve seat surrounding said port, a valve member engageable with said valve seat, an evacuated bellows held at one end stationary relative to said valve seat and connected at its other end to a movable frame, a second bellows connected at one end to said movable frame and connected at its other end to said valve member, an elongated member fixed to said valve member and engageable with said frame for limiting expansion of said second bellows, abutment providing means for limiting expansion and contraction of said evacuated bellows, means for subjecting the exterior of both of said bellows to the pressures at one side of said valve seat, and means including passage means extending through said valve member and said elongated member for subjecting the interior of said second bellows to the pressures at the other side of said valve seat.

9. A pressure control device comprising, in combination, a port, a valve seat surrounding said port, a valve member engageable with said valve seat for controlling the flow of fluid through said port, an evacuated bellows held at one end stationary relative to said valve seat and connected at its other end to a movable frame, a second bellows connected at one end to said movable frame and connected at its other end to said valve member, means fixed to said valve member and engageable with said frame for limiting expansion of said second bellows, abutment providing means for limiting expansion and contraction of said evacuated bellows, said valve member being in full open position when said evacuated bellows is fully contracted and said second bellows is fully expanded, means for subjecting the exterior of both of said bellows to the pressures at one side of said valve seat, means for subjecting the interior of said second bellows to the pressures at the other side of said valve seat, yieldable means acting between a stationary abutment and said frame for expanding said evacuated bellows and moving said valve member toward said valve seat when the pressure at the exterior of said bellows drops a predetermined amount, and yieldable means acting between said valve member and said frame for preventing contraction of said second bellows to open said valve member until the pressure at the exterior of said bellows exceeds the pressure at the interior of said second bellows by a predetermined amount.

10. A pressure control device comprising, in combination, a port, a valve seat surrounding said port, a valve member engageable with said valve seat, an evacuated bellows held at one end stationary relative to said valve seat and connected at its other end to a movable frame, a second bellows connected at one end to said movable frame and connected at its other end to said valve member, means fixed to said valve member and engageable with said frame for limiting expansion of said second bellows, means for subjecting the exterior of both of said bellows to the pressures at one side of said valve seat, means for subjecting the interior of said second bellows to the pressures at the other side of said valve seat, means operating to expand said evacuated bellows when the pressure at its outer surface drops to a predetermined value, means for limiting expansion of said evacuated bellows to an amount sufficient to seat said valve member when said second bellows is fully expanded, and means preventing contraction of said second bellows until the pressure at its outer surface exceeds the pressure at its interior by a predetermined amount.

11. A pressure control device comprising, in combination, a port, a valve seat surrounding said port, a valve member engageable with said valve seat, an evacuated bellows held at one end stationary relative to said valve seat and connected at its other end to a movable frame, a second bellows connected at one end to said movable frame and connected at its other end to said valve member, an elongated member fixed to said valve member and engageable with said frame for limiting expansion of said second bellows, means for subjecting the exterior of both of said bellows to the pressures at one side of said valve seat, means including passage means extending through said valve member and said elongated member for subjecting the interior of said second bellows to the pressures at the other side of said valve seat, yieldable means acting between a stationary abutment and said frame and operating to expand said evacuated bellows when the pressure at its outer surface drops to a predetermined value, abutment means engageable by said frame for limiting expansion of said evacuated bellows approximately to an amount sufficient to seat said valve member when said second bellows is fully expanded, and yieldable means preventing contraction of said second bellows until the pressure at its outer surface exceeds the pressure at its interior by a predetermined amount.

12. A pressure control device comprising, in combination, a port, a valve seat surrounding said port, a valve member engageable with said valve seat, an evacuated bellows held at one end stationary relative to said valve seat and connected at its other end to a movable frame, a second bellows connected at one end to said movable frame and connected at its other end to said valve member, means fixed to said valve member and operatively connected to said frame for limiting expansion of said second bellows, means for subjecting the exterior of both of said bellows to the pressures at one side of said valve seat, means including passage means extending through said valve member for subjecting the interior of said second bellows to the pressures at the other side of said valve seat, a spring acting between a stationary abutment and said frame and operating to expand said evacuated bellows when the pressure at its outer surface drops a predetermined amount below atmospheric, and a spring acting between said valve member and said frame for preventing contraction of said second bellows until the pressure at its outer surface exceeds the pressure at its interior by a predetermined amount.

13. A pressure control device comprising, in combination, a port, a valve seat surrounding said port, a valve member engageable with said valve seat, a valve stem connected to said valve member and having a guided portion, guiding means for said guided portion of said valve stem, an evacuated bellows held at one end stationary relative to said valve seat and connected at its other end to a movable frame, a second bellows connected at one end to said movable frame and connected at its other end to said valve stem, means fixed to said valve member and operatively connected to said frame for limiting expansion of said second bellows, passage providing means extending through said valve member for connecting the space at the side opposite said valve seat in communication with the interior of said second bellows, means for subjecting the exterior of both of said bellows except for the cross sectional area of said valve stem to the pressures at the other side of said valve seat, means operating to expand said evacuated bellows as the pressures opposing its expansion drop below a predetermined value, and means preventing contraction of said second bellows until the pressure at its exterior exceeds the pressure at its interior by a predetermined amount.

14. A pressure control device comprising, in combination, a port, a valve seat surrounding said port, a valve member cooperating with said valve seat for controlling the flow of fluid through said port, and pressure responsive means for controlling the operation of said valve member, said pressure responsive means including a pressure responsive member connected to said valve member and subjected continuously on opposite surfaces to the pressures at opposite sides of said valve seat, and a second pressure responsive member acting on said valve member and subjected on one side to the pressure at one side of said valve seat and on its opposite side to a subatmospheric pressure, said pressure responsive members operative individually at predetermined pressure differentials for moving said valve member relative to said seat.

15. A pressure control device comprising, in combination, a port, a valve seat surrounding said port and having supply and discharge sides, a valve member cooperating with said valve seat for controlling the flow of fluid through said port, and pressure responsive means for controlling the operation of said valve member, said pressure responsive means including a pressure responsive member connected to said valve member and subjected continuously on opposite surfaces to the pressures at opposite sides of said valve seat, and a second pressure responsive member acting on said valve member and subjected on one side to the pressures at the supply side of said valve seat and on its opposite side to a subatmospheric pressure, each of said pressure responsive members operative individually for moving said valve member relative to said seat when subjected to predetermined pressure differentials.

16. A pressure control device comprising, in combination, a port, a valve seat surrounding said port and having supply and discharge sides, a valve member cooperating with said valve seat for controlling the flow of fluid through said port, and pressure responsive means for controlling the operation of said valve member, said pressure responsive means including a pressure responsive member connected to said valve member and subjected continuously on opposite surfaces to the pressures at opposite sides of said valve seat, said pressure responsive member operating when the pressure differential between its surfaces exceeds a predetermined amount to unseat said valve, and a second pressure responsive member having an operative connection with said valve member, said operative connection transmitting movement from said second pressure responsive member to said valve member, said second pressure responsive member subjected on one surface to the pressures at the supply side of said valve seat and subjected on an opposite surface to a subatmospheric pressure, said second pressure responsive member operating to effect movement of said valve member toward its seat as the pressure at the supply side of said valve seat drops below a predetermined value.

17. A pressure control device comprising, in combination, a port, a valve seat surrounding said port, a valve member engageable with said valve seat, an evacuated bellows held at one end stationary relative to said valve seat and connected at its other end to a movable plate, a second bellows connected at one end to said plate and connected at its other end to said valve member, means for subjecting the exterior of both of said bellows to the pressures at one side of said valve seat, means for subjecting the interior of said second bellows to the pressures at the other side of said valve seat, and manually operated means for expanding or contracting said evacuated bellows.

18. A pressure control device comprising, in combination, a port, a valve seat surrounding said port, a valve member engageable with said valve seat, an evacuated bellows held at one end stationary relative to said valve seat and connected at its other end to a movable plate, a second bellows connected at one end to said plate and connected at its other end to said valve member, means for limiting the expansion and contraction of said bellows, said valve member being in full open position when said evacuated bellows is fully contracted and said second bellows is fully expanded, means for subjecting opposite surfaces on said second bellows to the pressures at opposite sides of said valve seat, and manually operated means connected to said plate for expanding or contracting said evacuated bellows.

19. A pressure control device comprising, in combination, a port, a valve seat surrounding said port, a valve member engageable with said valve seat, a bellows connected at one end to said valve member and connected at its other end to a movable plate, means for subjecting opposite surfaces on said bellows to the pressures at opposite sides of said valve seat, and manually operated means for adjusting the position of said movable plate.

20. A pressure control device comprising, in combination, a port, a valve seat surrounding said port, a valve member cooperating with said valve seat for controlling the flow of fluid through said port, and pressure responsive means for controlling the operation of said valve member, said pressure responsive means including a pressure responsive member connected to said valve member and subjected continuously on opposite surfaces to the pressures at opposite sides of said valve seat, and a second pressure responsive member connected to said first pressure responsive member and acting through the latter on said valve member, said second pressure responsive member subjected on one side to the pressure at one side of said valve seat and on its opposite side to a subatmospheric pressure.

21. A pressure control device comprising, in combination, a port, a valve seat surrounding said port, a valve member cooperating with said valve seat for controlling the flow of fluid through said port, and pressure responsive means for controlling the operation of said valve member, said pressure responsive means including a pressure responsive member connected to said valve member and subjected on opposite surfaces to the pressures at opposite sides of said valve seat, and a second pressure responsive member acting on said valve member through said first pressure responsive member and subjected on one side to the pressure at one side of said valve seat and on its opposite side to a subatmospheric pressure.

22. In a control system for a supercharged aircraft cabin having an air outlet, a pneumatically operable valve controlling said air outlet, a bellows having one end thereof supported in a stationary position and connected at its other end to a movable plate, a second bellows connected at one end to said movable plate and connected at its other end to said valve, means constantly tending to expand each of said bellows, and means for connecting the interior of one of said bellows with the space outside of the aircraft cabin, the exterior of both of said bellows being exposed to cabin pressure and the interior of said bellows which is not in communication with the exterior of the cabin being evacuated.

23. A pressure responsive device comprising, in combination, a port, a valve seat surrounding said port, a valve member movable relative to said valve seat for controlling the flow of fluid through said port, and means for adjusting automatically the position of said valve member relative to said valve seat, said last mentioned means including a plurality of pressure responsive members operatively connected to said valve member and operative individually to actuate the same, means for subjecting the opposite sides of one of said pressure responsive members to the pressures at the opposite sides of said valve seat, and means for subjecting the opposite sides of another of said pressure responsive members to the pressure at one side of said valve seat and to a subatmospheric pressure.

24. In a device for controlling the cabin pressure of an aircraft, a vent port for venting the cabin interior, a valve member for controlling communication through said vent port, a device responsive to cabin pressures for controlling said valve member, means yieldingly connecting said device to said valve member and through which said device operates on reduction of cabin pressure to a value corresponding to a predetermined height for actuating said valve member to vary venting to maintain the cabin pressure substantially constant, and a device responsive to the differentials in pressure between the cabin pressure and the exterior pressure and connected directly to said valve member for controlling the latter, said last mentioned device operative at predetermined pressure differentials for further actuating said valve member in opposition to said yielding means to vary venting.

25. In a device for controlling the cabin pressure of an aircraft, a vent port for venting the cabin interior, a valve member for controlling communication through said vent port, an expansible chamber control device having one side thereof subjected to cabin pressures for controlling said valve member, means yieldingly connecting said control device to said valve member and through which said device operates on reduction of cabin pressure to a value corresponding to a predetermined height for actuating said valve member to vary venting to maintain the cabin pressure substantially constant, and an expansible chamber control device responsive to the differentials in pressure between the cabin pressure and the exterior pressure and connected directly to said valve member for controlling the latter, said last mentioned control device operative at predetermined pressure differentials for further actuating said valve member in opposition to said yielding means to vary venting.

26. In a device for controlling the cabin pressure of an aircraft, a vent port for venting the cabin interior, a valve member for controlling communication through said vent port, an expansible chamber control device having one side thereof subjected to cabin pressures and the opposite side to a subatmospheric pressure, means yieldingly connecting said control device to said valve member and through which said device operates on reduction of cabin pressure to a value corresponding to a predetermined height for actuating said valve member to vary venting to maintain the cabin pressure substantially constant, and an expansible chamber control device having one side thereof subjected to cabin pressures and the opposite side to pressures at the exterior of the cabin and connected directly to said valve member for controlling the latter, said last mentioned device operative at predetermined pressure differentials for further actuating said valve member in opposition to said yielding means to vary venting.

WIN W. PAGET.

REFERENCES CITED

The following references are of record in the file of this patent:

UNITED STATES PATENTS

| Number | Name | Date |
| --- | --- | --- |
| 1,562,663 | Strong | Nov. 24, 1925 |
| 2,002,057 | Gregg | May 21, 1935 |
| 2,208,554 | Price | July 16, 1940 |
| 2,269,500 | Wildhack | Jan. 13, 1942 |
| 2,289,639 | Fausek et al. | July 14, 1942 |
| 2,307,199 | Cooper | Jan. 5, 1943 |
| 2,342,220 | Price | Feb. 22, 1944 |
| 2,345,547 | Roth | Mar. 28, 1944 |
| 2,391,197 | Schwien | Dec. 18, 1945 |
| 2,393,343 | Schroeder | Jan. 22, 1946 |
| 2,407,257 | Del Mar | Sept. 10, 1946 |

FOREIGN PATENTS

| Number | Country | Date |
| --- | --- | --- |
| 149,709 | Great Britain | Aug. 17, 1920 |
| 501,138 | Great Britain | Feb. 22, 1939 |
| 521,623 | Great Britain | May 27, 1940 |
| 679,386 | France | Jan. 9, 1930 |

OTHER REFERENCES

"Pressurized Cabin Control," by H. E. W. Tinker and H. S. Hubbard, "Aviation," Jan. 1941, pages 38, 119 and 124.